United States Patent [15] 3,643,170
Stanger [45] Feb. 15, 1972

[54] ENVELOPE DELAY COMPENSATION CIRCUIT

[72] Inventor: Leon J. Stanger, Quincy, Ill.
[73] Assignee: Harris-Intertype Corporation, Cleveland, Ohio

[22] Filed: Dec. 24, 1969
[21] Appl. No.: 887,970

[52] U.S. Cl. ..... 328/163, 328/155, 328/173, 330/30 D, 330/149
[51] Int. Cl. ..... H03b 1/04
[58] Field of Search ..... 307/293; 328/116, 117, 155, 328/162, 163, 173; 330/30 D, 69, 149–151

[56] References Cited

UNITED STATES PATENTS

| | | | |
|---|---|---|---|
| 2,950,440 | 8/1960 | Cooper | 328/155 |
| 3,037,168 | 5/1962 | Forrer | 328/117 X |
| 3,076,145 | 1/1963 | Copeland et al. | 328/117 X |
| 3,130,371 | 4/1964 | Copeland | 328/117 X |
| 3,153,207 | 10/1964 | Brown | 328/163 X |
| 3,532,905 | 10/1970 | Zijta et al. | 328/155 X |

*Primary Examiner*—Donald D. Forrer
*Assistant Examiner*—R. C. Woodbridge
*Attorney*—Hill, Sherman, Meroni, Gross & Simpson

[57] ABSTRACT

A network to compensate for group delay having a pair of circuit paths with a variable delay network in one path and a fixed delay network in the other path. The input information is coupled to both circuit paths and the output of the two paths is combined in a differential amplifier to produce a vector addition of the signals from the separate paths. An isolation network is provided in the variable delay circuit path and a resonant circuit is provided to have an adjustable Q and adjustable frequency of resonance and is also located in the same path. Means are provided to adjust the relative amplitudes of the two signals so that the resulting output of the differential amplifier will have a substantially constant amplitude regardless of the output frequency or phase.

9 Claims, 4 Drawing Figures

INVENTOR.
Leon J Stanger
BY Hill, Sherman, Meroni, Gross & Simpson
ATTORNEYS

INVENTOR.
Leon J Stanger
BY Hill, Sherman, Meroni, Gross & Simpson ATTORNEYS

INVENTOR
Leon J Stanger
BY Hill, Sherman, Meroni, Gross & Simpson ATTORNEYS

ENVELOPE DELAY COMPENSATION CIRCUIT

BACKGROUND OF THE INVENTION

Field of the Invention

The field of art to which this invention pertains is circuits to compensate for group delay, envelope delay, or delay distortion in an information signal. In particular, the present invention relates to a network to correct for nonlinear changes in phase with frequency.

SUMMARY OF THE INVENTION

It is an important feature of the present invention to provide a circuit to compensate for group delay.

It is another feature of the present invention to provide a circuit for adding a second information signal to a primary information signal to produce a resulting signal which has a substantially constant amplitude with increasing frequency.

It is an important object of the present invention to provide a group delay compensating circuit having two separate current paths with one of the current paths having a variable delay network and the other current path having a fixed delay network.

It is also an object of the present invention to provide a group delay circuit having a variable delay current path and a fixed delay current path and using a differential amplifier to add the two signals from the separate paths to provide a constant-amplitude output information signal.

It is an additional object of the present invention to provide a variable delay circuit for a group delay compensating network as described above which employs variable capacitance diodes and an associated potentiometer to produce the required variable delay effect.

It is another object of the present invention to provide a group delay compensating network as described above which employs an isolation network between the variable delay circuit and the fixed delay circuit thereof.

These and other objects, features and advantages of the invention will be readily apparent from the following description of a certain preferred embodiment thereof, taken in conjunction with the accompanying drawings, although variations and modifications may be effected without departing from the spirit and scope of the novel concepts of the disclosure.

BRIEF DESCRIPTION OF THE PREFERRED EMBODIMENT

Figure 3:
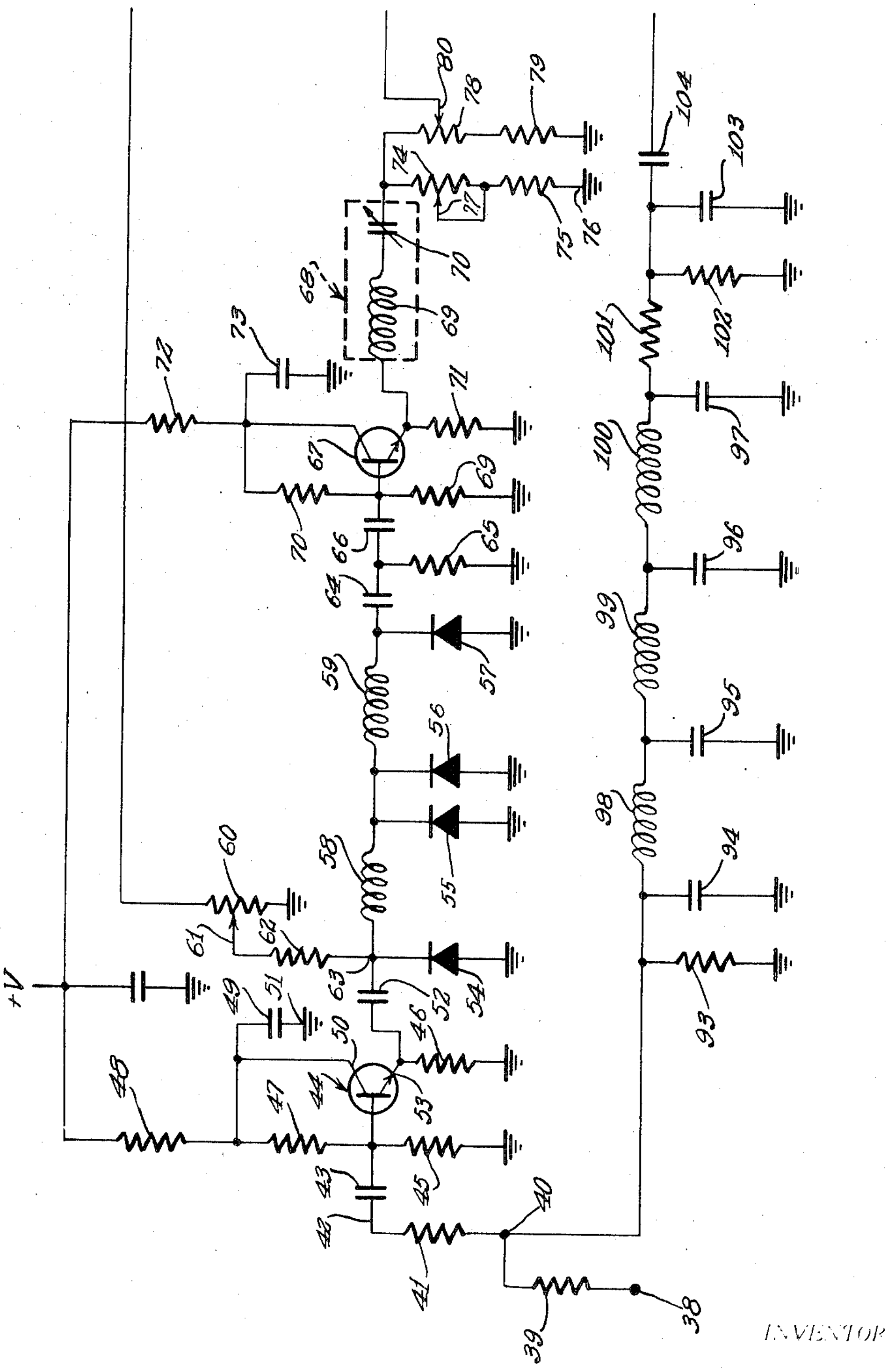
FIG. 3 is a portion of a group delay compensating network of the present invention illustrating the operation of the variable and fixed delay lines to produce the required signals as shown in the vector graph of FIG. 2.
Figure 4:
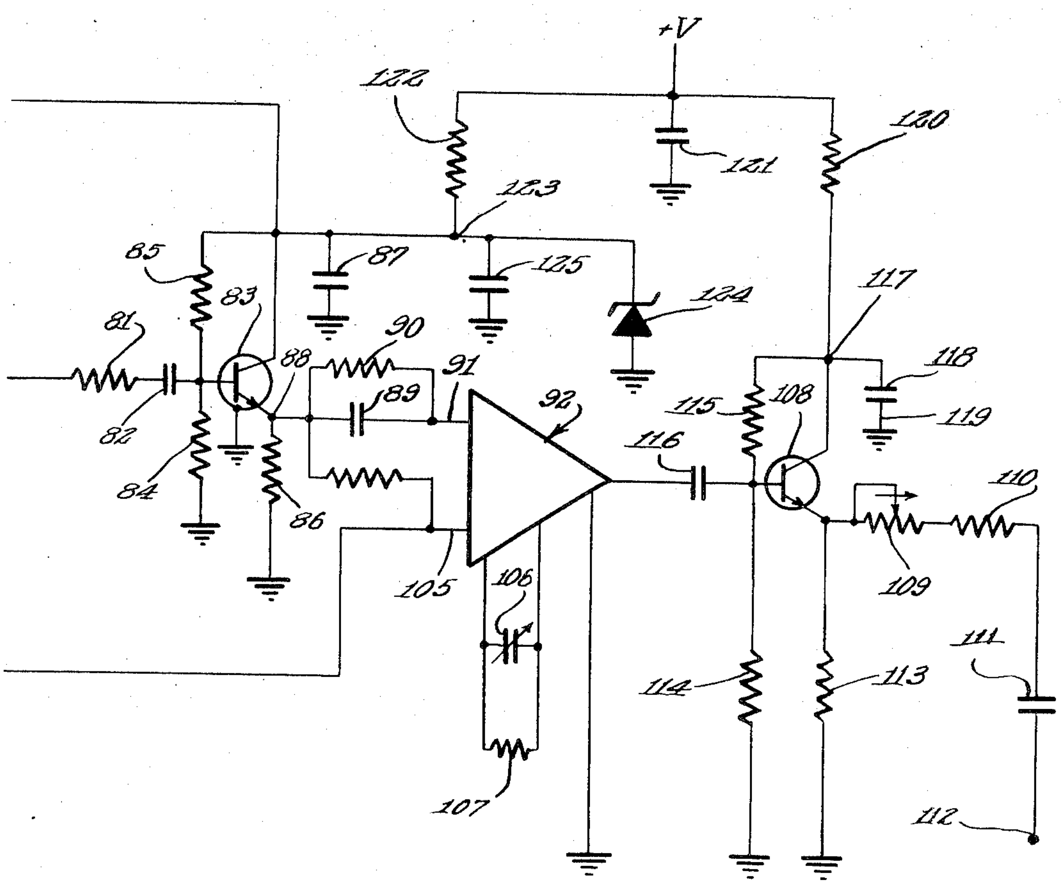
FIG. 4 is a portion of the circuit of FIG. 3, and the lead lines extending to the left in FIG. 4 are continuations of the lead lines extending to the right in FIG. 3.

The circuit shown in FIGS. 3 and 4 compensates for group delay. A pulse can only be reproduced properly if all the frequency components of that pulse are combined with the same amplitude and phase relationship as when it was generated. If, prior to the reproduction of the pulse from its frequency component, the phase undergoes a nonlinear change with frequency there will be a corresponding advance or delay in time of one frequency component with respect to another. This phenomenon is what is known as group delay, envelope delay or delay distortion. The magnitude of group delay is proportional to the rate of change of phase with frequency or circuit Q. In television, the major sources of group delay are the vestigal sideband (VSB) filter and notch diplexer at the transmitter and the 4.5 MHz. sound notch filter in the receiver.

Group delay which is compensated by the circuit of the present invention is evident as a variable amplitude on a frequency plot. A vector plot of an output signal having group delay might take the form of a circle which is to the right of center on a real versus imaginary axis graph. A circle is formed as the frequency is varied from zero to infinity. By the present invention, a vector having the proper amplitude and phase is added to the vector having group delay to produce a resulting output signal which is plotted as a circle centered about the origin thereby having a constant amplitude as frequency varies from zero to infinity.

The signal which is added to the primary signal having the group delay is produced by splitting the original input into a second current path and providing a specified delay to the signal thereby introducing the proper phase relationship between the primary signal and the signal which is being combined with the primary signal. The primary signal and the compensating signal are then added algebraically in a differential amplifier. Means are provided to adjust the amplitude of one of the two signals being combined, since proper amplitude as well as proper phase must be achieved in order to provide the required amplitude response with frequency.

Figure 1:
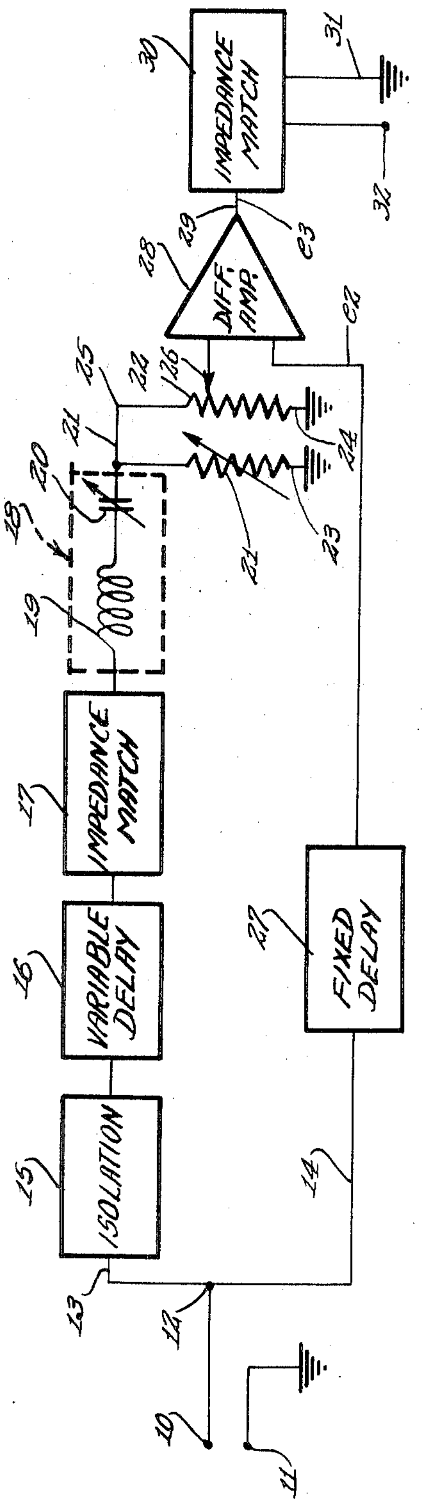
FIG. 1 is a block diagram of a group delay compensating network according to the present invention showing the positioning of the variable and fixed delay lines and the use of a differential amplifier to add the two inputs thereof.

Referring to the drawings in greater detail, FIG. 1 shows that an input signal may be coupled between first and second terminals 10 and 11 and applied to a circuit junction point 12 which divides into first and second current paths 13 and 14. The first current path 13 is coupled to an isolation device 15 which isolates the two current paths from each other. The signal is then coupled to a variable delay circuit 16 and from the delay circuit 16 to an impedance matching circuit 17. The impedance matching circuit 17 is coupled to a resonant circuit 18 which includes a coil 19 and a capacitor 20. The series resonant circuit 18 produces the group delay which is used to compensate for errors in other parts of the transmitting system.

The output of the resonant circuit 18 is coupled to a pair of parallel resistors 21 and 22, both of which are grounded as at 23 and 24. The resistor 21 is variable, as shown, and, accordingly, the Q of the resonant circuit 18 can be readily adjusted. In addition, the resistor 22 is provided with a movable tap 26 so that the final output voltage on the tap 26 may be adjusted.

The second current path 14 couples the input signal to a fixed delay circuit 27 which in turn is coupled to a differential amplifier 28. The movable tap 26 is also coupled to the differential amplifier 28. The amplifier 28 has an output 29 which is coupled to an impedance matching network 30 which is grounded as at 31 and which has an output terminal 32.

As explained, the signal which traverses the first current path 13 is the signal which generates the group delay phenomena in the series resonant circuit 18. The amplitude response is corrected by the signal in the second current path 14. Both of these signals are coupled to the input of the differential amplifier and are combined algebraically. The resulting signal at the output of the differential amplifier and at the output of the impedance match network 30 has a constant amplitude with frequency. The effect of this combination of signals can best be understood from viewing FIG. 2.

Figure 2:
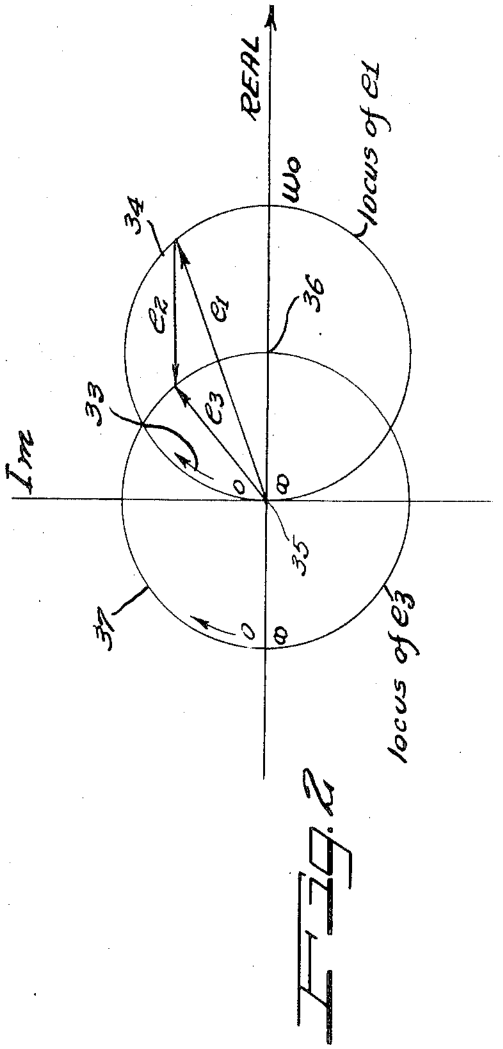
FIG. 2 is a vector plot of the initial voltage waveform, the compensating signal, and the resulting signal at the output of the differential amplifier which has a locus centered at the origin of the chart.

FIG. 2 is a vector plot of the various signals developed in the circuit of FIG. 1. The graphs shown in FIG. 2 are plots of voltages on the real and imaginary axis as frequency varies from zero to infinity.

The voltage labeled $e_1$ in FIG. 2 is the signal appearing at the circuit point 25 in FIG. 1. The vector $e_1$ in indicative of the amplitude of the voltage $e_1$ as the frequency varies from zero to infinity as indicated by the arrow 33. It can be shown that this locus is a circle 34 which begins at the origin 35 and which is centered at a point 36 which is one-half of the maximum amplitude of the voltage $e_1$.

By using the fixed delay circuit 27, a voltage $e_2$ can be reproduced which when combined with the voltage $e_1$ in the differential amplifier 28 produces a voltage $e_3$ at the circuit point 29. In this case, the voltage $e_3$ is centered about the origin 35 and has a constant amplitude as the frequency varies from zero to infinity. The locus, once again, is a circle 37.

A detailed circuit drawing is shown in FIGS. 3 and 4 for delay compensation. In particular, an input signal may be coupled to a circuit point 38 and fed through a first resistor 39 to a circuit point 40. Likewise, the signal is fed through a second resistor 41 through a circuit point 42. In this way, the input signal is split into first and second circuit lines as the circuit lines 13 and 14 of FIG. 1.

The signal at the circuit point 42 is coupled through a capacitor 43 to a transistor 44. The transistor 44 is an emitter follower and provides isolation between the two signal paths. In this way, changes in the variable delay line are not reflected to the fixed delay line. The transistor 44 has a number of resistors 45, 46, 47 and 48 associated therewith to provide the required biasing for the emitter follower. In addition, a capacitor 49 is coupled from the collector 50 of the transistor 44 to circuit ground at circuit point 51.

A coupling capacitor 52 couples the signal from the emitter 53 of the transistor 44 to the variable delay line which includes variable capacitance diodes 54, 55, 56 and 57 and inductors 58 and 59. A voltage source is provided on a resistor 60 and a movable tap 61 varies the value of the voltage as required. The voltage is coupled from the tap 61 through a further resistor 62 to a circuit point 63. By varying the position of the movable tap or slider 61, the voltage at the input to the variable delay line as at 63 is varied, and accordingly the capacitance of the diodes 54, 55, 56 and 57 is varied.

A capacitor 64 couples the output of the variable delay line to a resistor 65 which terminates the delay line. A further capacitor 66 couples the signal to the input of a transistor 67 which provides a low source impedance to drive a tuned circuit 68. The transistor 67 has resistors 69, 70, 71 and 72 associated therewith as well as a capacitor 73 to provide the required biasing for the transistor.

The tuned circuit 68 consists of an inductor 69 and a variable capacitor 70. These elements produce the group delay which is used to compensate for errors in other parts of the transmitting system.

A pair of series resistors 74 and 75 are coupled to circuit ground at point 76. The resistor 74 has variable tap 77 associated therewith. These resistors are used to select the Q of the tuned circuit 68.

Similarly, a second pair of series resistors 78 and 79 are used. The resistor 78 also has a variable tap 80. These resistors are used to adjust the amplitude of the information signal appearing at that circuit point. In particular, the movable tap 80 is used to adjust the amplitude of the signal $e_1$ as shown in FIG. 2.

The signal $e_1$ is then coupled through a resistor 81 and a capacitor 82 to a further emitter follower transistor 83 which serves as a common bias point and provides isolation between the variable and fixed delay lines.

The transistor 83 has resistors 84, 85 and 86 associated therewith as well as capacitor 87 for biasing purposes.

The output of the transistor as developed at the emitter 88 is coupled through a capacitor 89 and a resistor 90 to an input 91 of a differential amplifier 92.

Referring back to the input of the circuit shown in FIG. 3 the signal is split two ways at the circuit point 40, and one portion of the signal is coupled to a fixed delay line. The fixed delay line includes a resistor 93, capacitors 94, 95, 96 and 97 and inductors or coils 98, 99 and 100. The output of the delay line is coupled through a pair of resistors 101 and 102. These resistors form a 14 db. (for example) attenuator. A capacitor 103 provides a reduction of frequencies above 50 MHz. A further capacitor 104 couples the signal to the differential amplifier 92 at an input 105. The signal appearing at the circuit point 105 corresponds to the signal $e_2$ shown in FIG. 2.

The amplitude response of the differential amplifier 92 is set by a feedback network 106 and 107 as is well understood in a differential art. A further transistor 108 is a current amplifier which is used to drive a low impedance load. A variable resistor 109 provides a gain adjustment while an additional resistor 110 provides further isolation. The output signal is then coupled through a capacitor 111 to an output terminal 112.

The transistor 108 has a number of resistors, namely resistors 113, 114 and 115 associated therewith to provide the required operating level. Also, a capacitor 116 couples the output of the differential amplifier to the base of the transistor 108. The collector of the transistor 108 is coupled to a circuit point 117 which in turn is coupled to a capacitor 118 to ground as at 119. In addition, the circuit point 117 is coupled through a biased determining network including a resistor 120, a capacitor 121, a further resistor 122 to a circuit point 123. The voltage on the circuit point 123 is determined by a zener diode 124.

By adjusting the variable resistor 60, the phase of the signal $e_1$ as shown in FIG. 2 can be adjusted, and by adjusting the variable resistor 78, the amplitude of $e_1$ with respect to $e_2$ can be varied. In this way $e_1$ and $e_2$ can be properly phased and regulated at the inputs 91 and 105 of the differential amplifier to produce the required signal $e_3$ at the output of the differential amplifier. This signal $e_3$ as shown in FIG. 2 is centered at the origin of the graph and forms a circle about the origin as the frequency varies.

I claim as my invention:

1. A network to compensate for group delay comprising:
 means for dividing a signal into at least two current paths,
 means for delaying the signal in at least one of the two current paths,
 means for adjusting the amplitude of the signal in one of the two current paths relative to the amplitude of the signal in the other path,
 means for algebraically adding the signals in the two current paths, and
 a variable resonant circuit being provided in one of said two current paths and means being provided therein to selectably adjust the circuit Q.

2. A network to compensate for group delay comprising:
 means for causing a signal to traverse first and second current paths,
 a fixed delay line in said first current path and a variable delay line in said second current path,
 means for adjusting the amplitude of the signal in one of said current paths,
 a tuned circuit in one of said current paths and having an adjustable Q, and
 differential amplifier means combining the outputs of said first and second current paths to provide a constant amplitude output as frequency varies.

3. A network to compensate for group delay in accordance with claim 2 wherein an isolation transistor is provided in circuit between said fixed and said variable delay lines, whereby changes in said variable delay lines are not reflected to said fixed delay lines.

4. A network to compensate for group delay in accordance with claim 2 wherein a transistor having a low output impedance is coupled between said variable delay line and said tuned circuit.

5. A network to compensate for group delay in accordance with claim 2 wherein said variable delay line includes a series of voltage dependent capacitive diodes to alter the delay thereof in dependence on the voltage imposed on the capacitive diodes in the associated one of said current paths.

6. A network to compensate for group delay in accordance with claim 2 wherein means are provided to adjust the frequency of resonance of said tuned circuit.

7. A network to compensate for group delay comprising:
 means for dividing a signal into first and second current paths,
 a fixed delay line in said first current path and a variable delay line in said second current path, means for adjusting the amplitude of the signal in one of said current paths, a tuned circuit in one of said current paths and having means for adjusting the frequency of resonance, and differential amplifier means combining the outputs of said first and second current paths to provide a constant amplitude output as frequency varies.

8. A network to compensate for group delay comprising:

means for dividing a signal into at least two current paths, means in one of the current paths for producing a group delay and generating a first output signal which varies in amplitude and phase as the frequency varies from zero to infinity, means for producing a fixed delay in the other current path to generate a second output signal having characteristics such that when it is vectorially combined with said first output signal a resultant signal is developed which is fixed in amplitude as phase and frequency are varied, and means for vectorially adding the output signals from the two current paths.

9. A network in accordance with claim 8 wherein a variable delay line is included in one of the current paths to assist in matching the characteristics of the signals in the two paths so that when they are added together, the resultant signal will have a constant amplitude.

* * * * *